July 7, 1936.          C. DANUSER ET AL          2,046,812
ENGINE TEMPERATURE CONTROL DEVICE Filed Oct. 20, 1932

Inventors
Caflisch Danuser
and
Felix Danuser
By B. Singer
Attorney

Patented July 7, 1936

2,046,812

UNITED STATES PATENT OFFICE 2,046,812

ENGINE TEMPERATURE CONTROL DEVICE

Caflisch Danuser, Zurich, and Felix Danuser, Trogen, Switzerland

Application October 20, 1932, Serial No. 638,820
In Switzerland December 14, 1931

2 Claims. (Cl. 123—174)

The invention relates to a device on motor vehicles for controlling the temperature of the cooling water of the engine and the device is not only adapted to give a warning signal in the known manner and to stop the engine when the water exceeds a certain temperature, but the device is also adapted to become operative when the temperature of the cooling water sinks to an undesirable low temperature.

Devices are already known in which an electrical source of heat is switched on when the temperature of the water decreases. These devices have the disadvantage that they can only be used where the motor vehicle can be connected to the mains of an electricity works. Heating of water from the battery of the vehicle is not possible for any length of time as the source of current for the vehicle would be exhausted too rapidly and would consequently deleteriously affect the ignition and so forth.

The object of the present invention is to eliminate these and other disadvantages and this is effected in that, by the use of the battery of the vehicle, a separate source of heat, for example, a cooling water heater by petrol is set in operation. According to the present invention there is used a burner with a catalytic, that is to say, flameless combustion of petrol, the heating device being rendered operative by a mercury contact element through the medium of the vehicle battery as soon as the predetermined low temperature is reached. The battery current, by closing the circuit of the battery, by a relay and a heating coil, by means of a mercury contact element initiates the evaporation of the petrol and thus also the combustion of the petrol vapour, whilst the source of current of the heating coil is again switched off automatically in a novel manner as soon as the burner has been set in operation.

The battery is thus economized, as the voltage required is low.

According to the present invention the supply of petrol and so forth to the burner is controlled dependently on the cooling water so that the burner is switched off when the temperature has reached a predetermined degree. This switching off is effected by actuating a shut off valve provided in the petrol supply pipe, which valve is actuated both by a float and by a relay. The float controls the supply of petrol in that it maintains the petrol at a predetermined level whilst the relay shuts off the supply of petrol when the cooling water temperature has been raised sufficiently. If for any reason there is no supply of petrol in spite of the fact that the temperature of the cooling water has fallen below the predetermined minimum limit the battery is switched off by a switch controlled by the float so that even in this case the battery cannot be damaged by excessive current consumption and so forth.

In the accompanying drawing is illustrated diagrammatically one form of construction.

Figure 1:
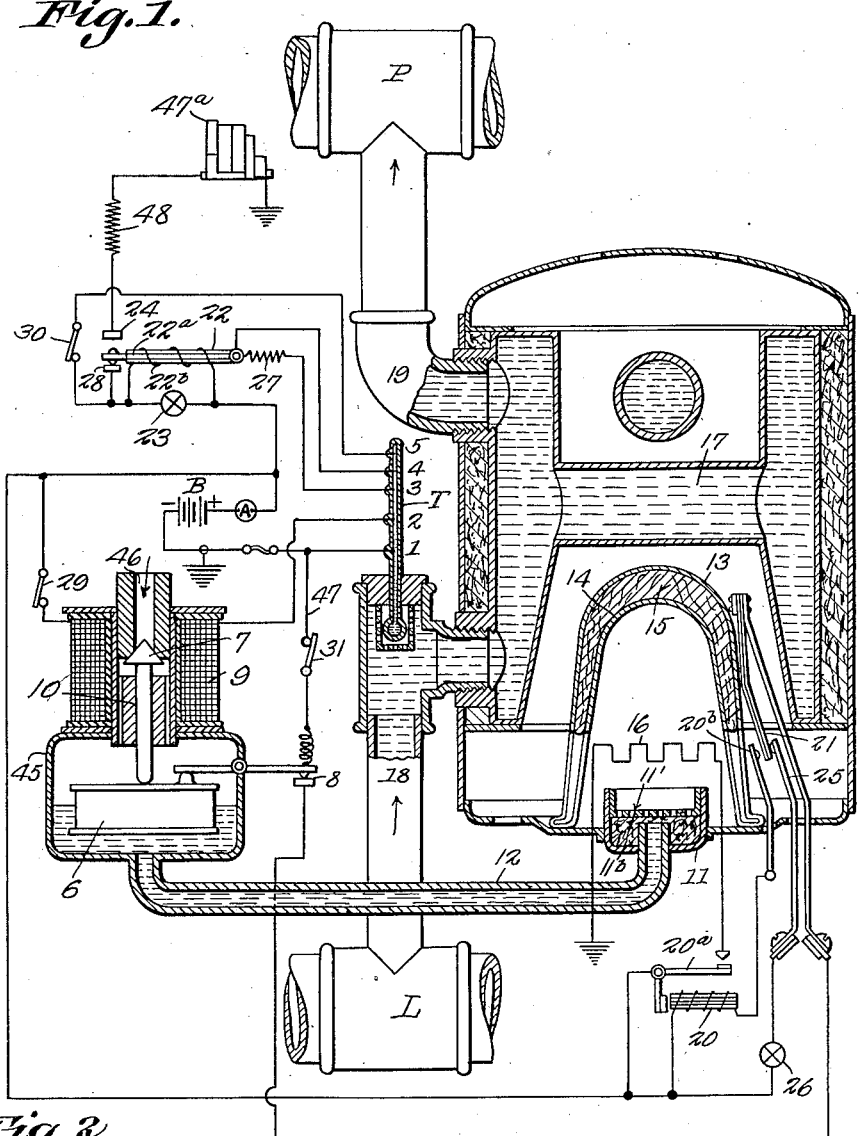
Fig. 1 shows the device diagrammatically partly in section.
Figure 2:
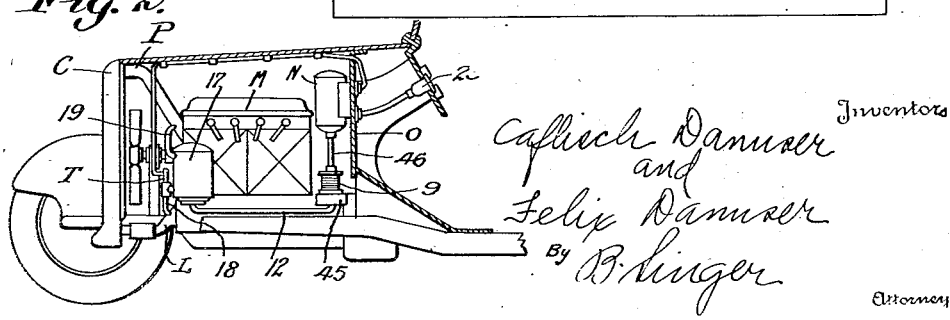
Fig. 2 illustrates the application of the device on a motor car, the front portion being shown in side elevation.

Referring to the Figs. 1 and 2, the cooling water system of a motor vehicle includes a boiler 17 whose upper end is connected by a pipe 19 with the pipe P leading from the water jacket of the motor M to the upper end of the radiator C. The lower end of the boiler 17 is connected by a pipe 18 with the pipe L connecting the lower end of the radiator C with the lower end of the water jacket of said motor. In the pipe 18 there is included a mercury contact element T provided with five fused-in contacts 1 to 5. The contact 1 is connected to the mass of the vehicle to which there is also connected the minus pole of the battery B. The latter is a normal vehicle battery with six to twelve volt pressure. The fused-in contacts 2, 3, 4 and 5 are so arranged in the contact element that the mercury comes in contact therewith when the temperature respectively rises to say 35°, 70°, 75°, 80° centigrade. Other temperature values may, however, be selected. These contacts are in circuits to be described hereinafter. The boiler 17 is provided with a thoroughly insulated water chamber into which the water enters at 18 and passes out at 19. For heating there is provided a burner 11 for a catalyst 15 located between two metal net works 13, 14, which ensures the flameless combustion of the petrol vapours which rise from the burner 11. The burner 11 is provided with a shell, filled with a petrol absorbent mass 11b which at the top is closed by a piece of metal netting 11'. This shell is connected by a pipe 12 to a float chamber 45. In the latter is provided a float 6 adapted to actuate a valve 7 controlling the petrol supply pipe 46 in such a manner that when the float rises the supply of petrol into the chamber 45 is cut off in the known manner.

On the casing 45 is mounted a coil 9 with a movable iron core 10. The latter acts on the valve 7 in such a manner that when the coil 9 is energized it is drawn upwardly and thus shuts off the supply of petrol. The coil 9 is connected to the contact 2 of the mercury contact element T and to the battery through a hand-switch 29. The hand-switch 29 is normally closed. It is solely adapted to serve to cut out in certain cases the coil 9 and thus to interrupt its operation. If the temperature of the cooling water rises to 35° the coil 9 is cut into the battery circuit and the petrol supply pipe is closed by the parts 10 and 7. The supply of petrol to the burner 11 is only continued until the float chamber 45 is emptied whereupon the burner is finally cut off.

In order to initiate evaporation of the petrol to the burner 11 there is provided a heating resistance 16 which at one end is connected to the mass of the vehicle and at the other end is adapted to be connected to the circuit by relay 20 and a circuit closer 20ª operated thereby. The relay 20 is conductively connected to the battery B and is controlled by a thermostat 21 arranged near the catalyst 15. The thermostat is conductively connected by the contact 1 through a line 47 to the mercury contact element T. In this line there is included a switch 8, controlled by the float 6, and a hand-switch 31. The switch 8 opens the circuit when the supply of petrol in the container 45 reaches a predetermined lower limit. The switch 31 is a hand-switch which is normally closed and is only opened when the operation of the relay is to be stopped. In the circuit of the thermostat 21 there is also included a signal lamp 26 which when illuminated indicates that the catalyst is in operation. A flasher switch 22 of known construction including a bimetallic strip 22ª surrounded by a heating coil 22ᵇ and having a signal lamp 23 arranged in parallel therewith is connected to the battery B by way of various electrical connector means such as contact 28 resistance 27 and hand-switch 30 and the mercury contacts 3, 4 and 5. This flasher switch allows the lamp 23 to be illuminated when the mercury contact 3 has reached, for example, 70° C. If the temperature rises to 4, for example 75°, the lamp 23 flashes. If the temperature of the cooling water continues to rise, for example, to 80° C., then the heating coil of the switch and the lamp 23 continuously receive current, the bimetal strip closing the contact 24 which grounds the primary circuit of the ignition coil 47ª and the engine stopped.

By opening the switch 30 the driver can again set the engine in operation in spite of the over heating of the cooling water so as to enable him, for example, to travel a further short distance.

The method of operation is as follows:—By opening a cock which is not shown in the drawing, petrol passes through the pipe 46 into the chamber 45, under the action of gravity until the valve 7 is closed by the rising float 6, which in its raised position closes the contact 8.

The drawing Fig. 1 shows the position of the various parts when the cooling water is at a temperature below 35° C., that is to say, during the operation of the catalyst.

The heating of the catalyst is automatically started as soon as the contact 8 is closed. At this low temperature of the cooling water and the catalyst the thermostat will engage the contact 20ᵇ so that the closing of the contact 8 energizes the relay 20 which in turn closes the circuit of the heating resistance 16. After the evaporation of the petrol has been thus started and the catalyst set in operation the heat produced by the same causes the bimetallic strip of the thermostat 21 to dis-engage the contact 20ᵇ whereby the relay 20 is cut out and the circuit of the heating resistance 16 opened. The bimetal strip of the thermostat 21 bears now against contact 25 by reason of the heating which has taken place. The Fig. 1 illustrates this operating condition and it will be noted that lamp 26 is illuminated and indicates that the apparatus is heating. When the level of petrol in the chamber 45 descends owing to the consumption of petrol, the float 6 opens the valve 7 to permit the replenishment of petrol in said chamber, as long as the water temperature remains below 35° C.

If the temperature, however, rises above about 35° C., current passes through the magnet coil 9 owing to the mercury touching the contact 2, thus attracting the core 10 which moves and maintains the valve 7 in closed position until the mercury in contact element T has dropped below contact 2. The burner operates only as long as sufficient petrol is available for feeding it, then it extinguishes. The float 6 sinks owing to the consumption of the fuel in chamber 45 and opens contact 8. By reason of the cooling of the burner which will take place now the thermostat 21 again engages the contact 20ᵇ leading to the relay 20, but this cannot operate as its operating circuit is open at 8. Only when the cooling water cools off to below 35° C., the mercury in the contact element T again sinks to below contact 2 (35° C.) and thereby the magnet coil 9 becomes deenergized so that the core 10 and the valve needle 7 fall and petrol flows again into the float chamber 45. The float now rises and closes contact 8. Relay 20 again receives current and closes the heating coil 16 as already described. The burner again commences to operate and the operating cycle as described is repeated.

If the temperature of the cooling water rises to such an extent that the mercury touches contact 3 (70° C.) a circuit is closed through the mercury over the contacts 1 and 3. In this circuit is included the resistance of the flashing switch 22. By reason of the resistance 27 the lamp and heating coil of the flashing switch do not receive full tension and the flasher does not operate.

If the temperature rises still further up to contact 4 (about 75° C.) the lamp 23 and the heating wire of the flasher 22 receive the full voltage, the bimetal strip of the flasher comes into operation and periodically opens contact 28. The lamp 23 then flashes with full voltage.

When the mercury column reaches contact 5 the heating wire of the flasher 22 and the lamp 23 continually receive full voltage. The flasher no longer closes contact 28 but closes contact 24 and thus connects the primary circuit of the ignition coil 47a or of the magnets over the mercury to ground. The engine is thus stopped, a suitable resistance 48 protecting the mercury contact element from dangerous current strength from the ignition coils.

The switches 29, 30 and 31 serve in particular cases to cut certain groups of apparatus but are normally closed. Switch 30 is, for example, opened when the driver in spite of over heating desires to travel a short distance further for particular reasons.

As shown in Fig. 2 the feed pipe 46 is connected with a container N fixed to the dash board O and the lamp 23 is arranged on the instrument board near the steering wheel well in front of the driver.

We claim:
1. Apparatus for use in motor vehicles to control the temperature of the cooling water of the engine, comprising a water heater, means to connect said heater into the circuit of the cooling water, a burner for said water heater, means responsive to change of temperature of the cooling water to control the feeding of fuel to said burner, means to ignite the fuel by the battery of the engine, means to stop the engine when the temperature of the cooling water exceeds a predetermined limit, a heating resistance above the burner, a switch in the circuit of the heating resistance, a fuel supply duct leading to the burner and a float in said supply duct and which controls the switch to open the circuit of the heating resistance in case of deficiency of fuel in the burner.

2. In apparatus of the class described, water heating and circulating means, a burner, an igniter for the burner, means to feed fuel to the burner including a tank vessel, a float therein, and a fuel feed valve movable with the float, an electrically energizable coil and means actuated thereby to close said fuel feed valve independently of the float, a circuit including the igniter, a thermostatically acting make-and-break, adapted to close said circuit upon a drop of temperature of the heated water below a predetermined degree and opening said circuit upon a rise of the temperature of the water above a predetermined degree, a normally open circuit including said electrically energizable coil, and a mercury control element subject to control by variations in temperature of the water, and adapted to close said coil circuit at a predetermined temperature above the temperature at which the igniter circuit is opened to hold the fuel feed valve closed to prevent further feed of fuel to the tank vessel.

CAFLISCH DANUSER.
FELIX DANUSER.